(12) United States Patent
Nakamura et al.

(10) Patent No.: US 8,361,650 B2
(45) Date of Patent: Jan. 29, 2013

(54) SEALING GASKET FOR ALKALINE DRY CELL

(75) Inventors: Masato Nakamura, Shizuoka (JP); Yuji Tsuchida, Shizuoka (JP); Yukiyoshi Murakami, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 1078 days.

(21) Appl. No.: 11/991,754

(22) PCT Filed: Jul. 11, 2006

(86) PCT No.: PCT/JP2006/313764
§ 371 (c)(1),
(2), (4) Date: Dec. 16, 2008

(87) PCT Pub. No.: WO2007/032141
PCT Pub. Date: Mar. 22, 2007

(65) Prior Publication Data
US 2009/0263714 A1 Oct. 22, 2009

(30) Foreign Application Priority Data
Sep. 12, 2005 (JP) .................................. 2005-263979

(51) Int. Cl.
*H01M 2/08* (2006.01)
(52) U.S. Cl. ...................................................... 429/185
(58) Field of Classification Search ............... 429/185
See application file for complete search history.

(56) References Cited

FOREIGN PATENT DOCUMENTS

| EP | 1681736 A1 | 7/2006 |
|---|---|---|
| JP | 4-87149 A | 3/1992 |
| JP | 2000-294206 A | 10/2000 |
| JP | 2001-43836 A | 2/2001 |
| JP | 2005-79021 A | 3/2005 |
| JP | 2005-93204 A | 4/2005 |

OTHER PUBLICATIONS

CAMPUSplastics, "datasheet Zytel 151 NC010", http://www.campusplastics.com/campus/en/datasheet/Zytel%C2%AE+151+NC010/DuPont+Engineering+Polymers/52/f0d96293.*

* cited by examiner

*Primary Examiner* — Yogendra Gupta
*Assistant Examiner* — Alison Hindenlang
(74) *Attorney, Agent, or Firm* — Harness, Dickey & Pierce, PLC

(57) ABSTRACT

[Problems] A sealing gasket for an alkaline dry cell formed from a 6-12 nylon resin by injection molding, which is inhibited from cracking that occurs at inserting a current collector through a central boss portion of a gasket and thereby reliably reduces occurrence of liquid leakage while retaining the advantages due to the use of the 6-12 nylon resin.
[Means for Solving the Problems] A polyhexamethylene dodecamide resin is used as a resin material of injection molding, and one part or the whole of the same kind of recycled material which was once used in injection molding is used as the resin material of a section including at least the boss portion.

4 Claims, 2 Drawing Sheets

SEALING GASKET FOR ALKALINE DRY CELL

TECHNICAL FIELD

The present invention relates to sealing gaskets for alkaline dry cells, and in particular, to sealing gaskets formed by injection molding that include a central boss portion having a through-hole through which a current collector is press-fittedly inserted, and a polyhexamethylene dodecanamide resin, so-called a 6-12 nylon resin is used as a resin material in injection molding.

BACKGROUND ART

In a cylindrical alkaline dry cell such as LR6 or LR03, an alkaline power generation element including a cathode mixture, a separator, and an anode mixture is contained in a cylindrical metallic cathode can with a closed bottom, and an opening of the cathode can is sealed in an airtight manner by using a resin gasket, as disclosed in Patent document 1 for example.

The power generation element in which the tubular separator impregnated with an alkaline electrolyte is placed inside of the tubular-molded cathode mixture, and the gelled anode mixture is filled inside of the separator. The cathode can serves as a cell case, and also as a cathode current collector and a cathode terminal by directly contacting the cathode mixture. A metallic anode current collector in a bar shape is inserted into the anode mixture. This anode current collector is fixed by welding upright at an internal surface of a dish-shaped metallic anode terminal plate. The anode terminal plate, the anode current collector, and the sealing gasket are preassembled together, and configure a sealing unit that closes an opening of the cathode can.

The sealing gasket is a single-piece molded member of a polyamide resin, i.e. a nylon resin, and is formed by injection molding. The gasket includes a central boss portion, a peripheral packing portion and a middle barrier-wall portion, all of which are concentrically formed. Thin wall parts are partially formed in the gasket so that safety valve and stress-absorbing functions are provided. A through-hole through which the anode current collector is press-fittedly inserted is formed in the central boss portion.

Conventionally, a 6-6 nylon resin is used as the polyamide resin for the above-mentioned sealing gasket. However, in order to further improve durability and anti-leakage performance of the alkaline dry cell in a hot and humidity condition, the sealing gasket made of the polyhexamethylene dodecanamide resin, so-called the 6-12 nylon resin, is being developed as disclosed in Patent Document 2.

With such sealing gasket made of the 6-12 nylon resin, as described in Patent Document 2, it is possible to certainly improve the reliability of the safety valve operation and the anti-leakage performance in the alkaline dry cell using a sealing structure with a small number of parts and a low cost.
Patent Document 1: Japanese Patent Application Laid-Open Publication No. H11-250875
Patent Document 2: Japanese Patent Application Laid-Open Publication No. 2005-79021

DISCLOSURE OF INVENTION

Problems to be Solved by the Invention

However, the inventors have revealed that, when the 6-12 nylon resin gasket is used in manufacturing the alkaline dry cell, a problem occurs in which the central boss portion of the gasket is apt to crack when the current collector is inserted through the central boss portion, and thereby the crack causes liquid leakage of the cell.

The present invention has been contrived for solving the above-mentioned technical problem, and it is an object thereof to provide a sealing gasket for an alkaline dry cell formed from a 6-12 nylon resin by injection molding, which is inhibited from cracking that occurs at inserting a current collector through a central boss portion of a gasket and thereby reliably reduces occurrence of liquid leakage while retaining the advantages due to the use of the 6-12 nylon resin.

Other objects and configurations of the present invention will become clear from the description of the present specification and the accompanying drawings.

Means for Solving the Problems

Means for solving the problems of the present invention are as follows.

(1) A sealing gasket of an alkaline dry cell formed by injection molding a polyamide resin, including: a central boss portion including a through-hole through which a current collector is press-fittedly inserted; a peripheral packing portion interposed between a peripheral portion of an anode terminal plate and an opening of a cathode can; and a middle barrier wall portion, wherein a polyhexamethylene dodecanamide resin (6-12 nylon resin) is used as a resin material of injection molding, and a same kind of a recycled material which has been once used in injection molding is used as a part or a whole of the resin material of a section including at least the boss portion.

(2) The sealing gasket of the alkaline dry cell according to means (1), wherein a mixed material of the recycled material of polyhexamethylene dodecanamide resin and a virgin material of polyhexamethylene dodecanamide resin is used as the resin material of injection molding, and a percentage of the recycled material is equal to or more than 10% by weight.

(3) The sealing gasket of the alkaline dry cell according to the above means (1) or (2), wherein the recycled material is pulverized particles, of a runner, generated in the injection molding process.

(4) A sealing gasket of an alkaline dry cell formed by injection molding of a polyamide resin, including: a central boss portion including a through-hole through which a current collector is press-fittedly inserted; a peripheral packing portion interposed between a peripheral portion of an anode terminal plate and an opening of a cathode can; and a middle barrier wall portion, wherein a polyhexamethylene dodecanamide resin is used as a resin material of injection molding, and moisture in at least the boss portion is set equal to or more than 1%.

(5) A sealing gasket of an alkaline dry cell formed by injection molding of a polyamide resin, including: a central boss portion including a through-hole through which a current collector is press-fittedly inserted; a peripheral packing portion interposed between a peripheral portion of an anode terminal plate and an opening of a cathode can; and a middle barrier wall portion, wherein a polyhexamethylene dodecamide resin is used as a resin material of injection molding, and an internal diameter of the through-hole of the central boss portion is equal to or more than 0.91 times and less than 1 times a diameter of the current collector.

Effects of the Invention

A sealing gasket for an alkaline dry cell formed from a 6-12 nylon resin by injection molding, which is inhibited from cracking that occurs at inserting a current collector through a central boss portion of a gasket and thereby reliably reduces occurrence of liquid leakage while retaining the advantages due to the use of the 6-12 nylon resin.

Other functions and effects of the present invention will become clear from the description of the present specification and the accompanying drawings.

EXPLANATION OF REFERENCE NUMERALS

| 10 | alkaline dry cell |
|---|---|
| 15 | cathode can (cell case) |
| 20 | alkaline power generation element |
| 21 | cathode mixture |
| 22 | separator |
| 23 | anode mixture |
| 25 | anode current collector |
| 30 | sealing gasket |
| 31 | central boss portion |
| 32 | peripheral packing portion |
| 33 | middle barrier wall portion |
| 35, 36 | thin wall part |
| 40 | anode terminal plate |

BEST MODE FOR CARRYING OUT THE INVENTION

Figure 1:
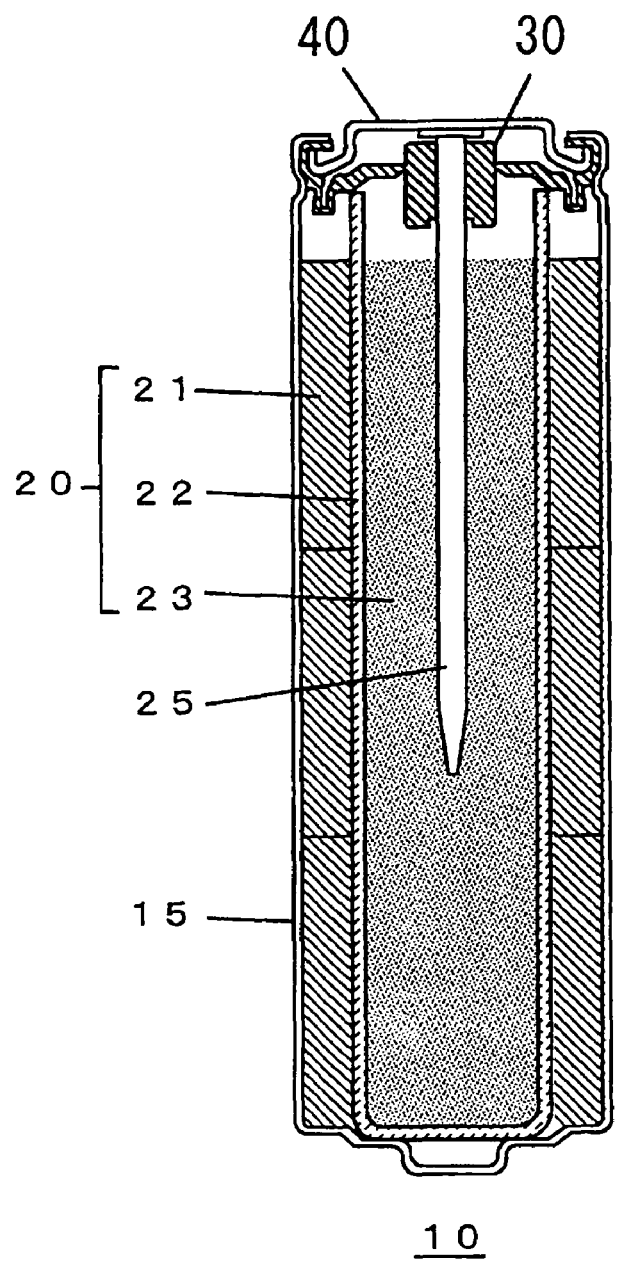
FIG. 1 is a cross-sectional view of an alkaline dry cell employing a sealing gasket according to the present invention.

FIG. 1 is a cross-sectional view of an alkaline dry cell employing a sealing gasket according to the present invention. The alkaline dry cell 10 illustrated in FIG. 1 is a LR6 cell, in which an alkaline power generation element 20 including a cathode mixture 21, a separator 22, and an anode mixture 23 is contained in a cylindrical metallic cathode can 15 with a closed bottom, and the opening of the cathode can 15 is sealed in an airtight manner using a resin gasket 30.

In the power generation element 20, the tubular separator 22 impregnated with an alkaline electrolyte is placed inside of the tubular-molded cathode mixture 21, and the gelled anode mixture 23 is filled inside of the separator 22.

The cathode can 15 serves as a cell case, and also as a cathode current collector and a cathode terminal by directly contacting the cathode mixture 21. A metallic anode current collector 25 in a bar shape is inserted into the anode mixture 23. This anode current collector 25 is fixed by welding upright at a center of an internal surface of a dish-shaped metallic anode terminal plate 40. A small opening (not shown) for releasing a gas is provided in the anode terminal plate 40. The anode terminal plate 40, the anode current collector 25, and the sealing gasket 30 are integrally preassembled and configure a sealing unit that closes an opening of the cathode can 15.

The sealing gasket 30 is placed between the cathode can 15 and the anode terminal plate 40 and seals the cathode can 15 in an airtight manner. The sealing gasket 30 is molded by injection molding in which a polyhexamethylene dodecanamide resin, so-called a 6-12 nylon resin is the molding material.

Figure 2:
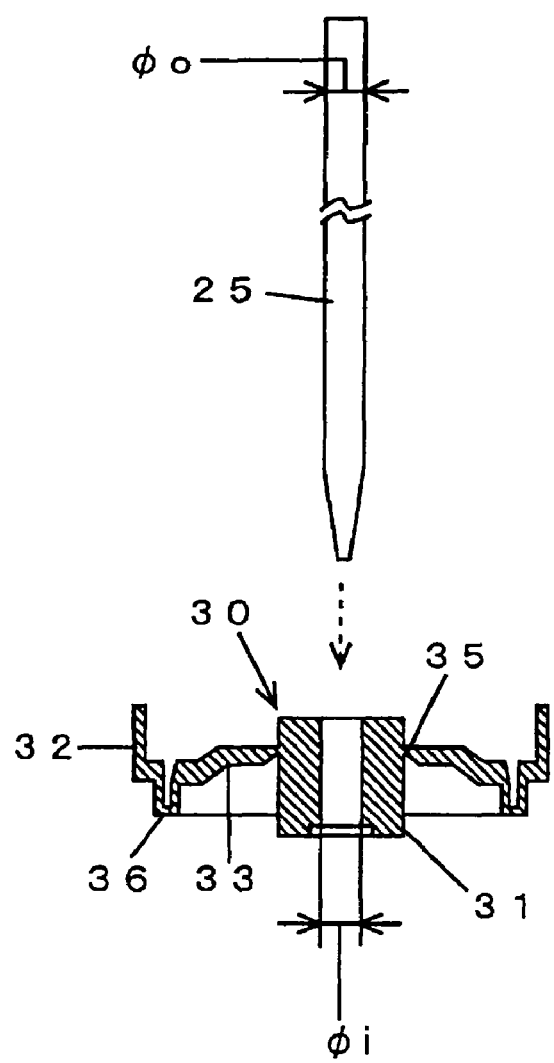
FIG. 2 is a cross-sectional view of the sealing gasket according to the present invention.

As shown in a cross-sectional view of FIG. 2, the sealing gasket 30 includes a central boss portion 31, a peripheral packing portion 32, and a middle barrier wall portion 33, all of which are concentrically formed. Further, a first thin wall part 35 and a second thin wall part 36 are formed at the inner and outer circumferences of the middle barrier wall portion 33, respectively.

The central boss portion 31 has a through-hole through which the anode current collector 25 is press-fittedly inserted along the central axis thereof. The peripheral packing portion 32 is disposed between the opening of the cathode can 15 and a peripheral portion 42 of the anode terminal plate 40, and defines an airtight sealing state by stress deformation (elastic deformation) caused by flexing the opening of the cathode can 15 inwardly. The middle barrier wall portion 33 defines an airtight annular barrier wall between the boss portion 31 and the peripheral packing portion 32.

The first thin wall part 35 acts as a safety valve that relieves an internal pressure by breaking beforehand when the internal pressure of the cathode can 15 abnormally increases. The second thin wall part 36 is formed by bending the circular part between the peripheral packing portion 32 and the middle barrier wall portion 33 in a vertical direction, and acts as a stress absorbing part.

The above-mentioned sealing gasket 30 is formed by injection molding the 6-12 nylon resin. However, regarding a resin material of injection molding, a mixture of a recycled material of the same kind (6-12 nylon) that was once used in injection molding is used as the resin material of a section including at least the boss portion 31.

There is no limitation to this recycled material as long as the material was once used in injection molding. More specifically, pulverized particles of a runner generated in injection molding process can be suitably used. Further, it is preferable to use the pulverized particles of the runner generated in injection molding of the sealing gasket 30. That is, a mixed material of the recycled material of polyhexamethylene dodecanamide resin and a virgin material of polyhexamethylene dodecanamide resin is used as the resin material of injection molding.

Thus, it is possible to use almost all of the resin material in injection molding of the sealing gasket 30 without any waste, and thereby cost-reduction becomes possible. It should be noted that, here, the remarkable benefits include, in addition to the cost-reduction using the recycled material, the suppression of the crack that has been generated when the current collector 25 is press-fittedly inserted through the through-hole of the boss portion 31.

Generally, as the resin material of injection molding, it has been considered that the unused virgin material is materially superior to the recycled material, even though it is at a high cost. However, in the case of the sealing gasket for the alkaline dry cell, especially the sealing gasket made of the 6-12 nylon resin, the present inventors have revealed that the usage of the mixed material of the virgin material and the recycled material is specifically effective for reducing crack in the boss portion 31, rather than using only the unused virgin material. Further, it is also revealed that it is especially effective when the percentage of the recycled material is equal to or more than 10% by weight.

Many runners are generated in injection molding of the sealing gasket 30, however it is considerably effective to use such runners as the recycled material for achieving the cost-reduction and anti-leakage effect. Though the runner is a part corresponding to a resin inflow path in injection molding, the present inventors came to know that this part has material characteristic of effectively reducing crack in the boss portion 31.

The reasons that the cracks are suppressed in the boss portion 31 is conceived to be because the molding condition of injection molding becomes stable due to the recycled material, and the resin flow in the boss portion 31 of the gasket 30 is improved, and thereby the problem decreases in the resin flow in the boss portion 31.

Further, the present inventors have also revealed that, the moisture in the boss portion 31 of the sealing gasket 30 is greatly concerned with the crack generation when the current collector 25 is inserted into the boss portion 31. That is, by adding more than a certain amount of moisture to the nylon resin material, it is possible to make the nylon resin material generate viscosity and decrease the crack in the boss portion 31. Regarding the amount of moisture to be impregnated, it is revealed that the moisture should be equal to or more than 1% (by weight) in at least the boss portion 31.

Furthermore, as shown in FIG. 2, regarding the external diameter of the current collector 25 ø o, and the internal diameter of the through-hole of the boss portion 31 ø i, it is revealed that when the internal diameter of the through-hole of the central boss portion 31 ø i, is equal to or more than 0.91 times and less than 1 time the external diameter of the current collector 25 ø o, the stress between the boss portion 31 and the current collector 25 is optimized, and it is possible to achieve the optimal state for both ensuring the airtightness between the boss portion 31 and the current collector 25 and reducing crack in the boss portion.

EMBODIMENTS

The crack generation state in the boss portion has been examined by creating various plurality of types of sealing gaskets (Samples 1 to 9) with each different conditions regarding the gasket material (the virgin material/the recycled material), moisture in the boss portion of the gasket, and the ratio of ø i to ø o (ø i/ø o), in which the ø i is the internal diameter of the through-hole of the boss portion, and the ø o is the external diameter of the current collector.

Table 1 shows a typical example of the result thereof.

TABLE 1

Gasket Material, Moisture, Ratio of Boss portion Internal Diameter/Current Collector Diameter, and Crack Generation Ratio in Boss portion

|  | Sample 1 (Conventional Type) | Sample 2 | Sample 3 | Sample 4 | Sample 5 |
|---|---|---|---|---|---|
| Gasket Material | virgin material | containing recycled material 25% | containing recycled material 100% | containing recycled material 25% | containing recycled material 25% |
| Moisture in Gasket Boss portion (%) | 0.5 | 0.5 | 0.5 | 1.0 | 0.5 |
| Boss portion Internal Diameter/ Current Collector Diameter (øi/øo) | 0.89 | 0.89 | 0.89 | 0.89 | 0.91 |
| Boss portion Crack Generation | 25 ppm | 10 ppm | 10 ppm | 5 ppm | 5 ppm |

TABLE 1-continued

Gasket Material, Moisture, Ratio of Boss portion Internal Diameter/Current Collector Diameter, and Crack Generation Ratio in Boss portion

| Ratio | Sample 6 | Sample 7 | Sample 8 | Sample 9 |
|---|---|---|---|---|
| Gasket Material | containing recycled material 25% | containing recycled material 25% | containing recycled material 25% | containing recycled material 10% |
| Moisture in Gasket Boss portion (%) | 1.0 | 2.0 | 2.0 | 0.5 |
| Boss portion Internal Diameter/ Current Collector Diameter (øi/øo) | 0.91 | 0.89 | 0.91 | 0.89 |
| Boss portion Crack Generation Ratio | 0 ppm | 0 ppm | 0 ppm | 15 ppm |

As shown in Table 1, all of the samples in the group that used the recycled material (Samples 2 to 9) have significantly reduced the boss portion crack generation ratio, compared to the sample that used only the virgin material (Sample 1).

Further, it is revealed that the boss portion crack generation ratio can be significantly reduced by making the moisture in the resin material of the boss portion equal to or more than 1%, as shown in Samples 4, and 6 to 8.

Furthermore, it has been confirmed that to make the ratio of the internal diameter of the through-hole of the boss portion øi to the external diameter of the current collector øo (øi/øo) equal to or more than 0.91, such as in Samples 5, 6 and 8, is effective for reducing the boss portion crack generation ratio. The crack generation in the boss portion may increase if the above ratio (øi/øo) is less than 0.91. On the other hand, the above ratio (øi/øo) needs to be less than 1.0 in order to let the current collector press-fittedly insert into the through-hole of the boss portion. Therefore, it is preferable that the above ratio (øi/øo) is equal to or more than 0.91 and less than 1.0.

In theory, the mixing ratio of the recycled material can be 100%. However, since the recycled material is incidentally generated with injection molding of the gasket, it is not always expedient to increase the mixing ratio of the recycled material in terms of the utilization efficiency of the resin material.

In order to use the recycled material that is incidentally generated without excess and without deficiency, and thereby optimize the production cost, it is preferable that the mixing ratio is within a range of 10 to 25%. It should be noted that the effect of reducing the boss portion crack generation by mixing the recycled material is remarkable when the mixing ratio of the recycled material is around 10 to 25%, however the effect of reducing the boss portion crack generation does not obviously increase by the further increase of the mixing ratio.

In the foregoing, the present invention was described based on the typical embodiments. However, beside the above-mentioned embodiments, the present invention may be in various modes.

INDUSTRIAL APPLICABILITY

The sealing gasket for the alkaline dry cell formed from the 6-12 nylon resin by injection molding, which is inhibited from cracking that occurs at inserting the current collector through the central boss portion of the gasket and thereby reliably reduces occurrence of liquid leakage while retaining the advantages due to the use of the 6-12 nylon resin.

The invention claimed is:

1. A sealing gasket of an alkaline dry cell formed by injection molding a polyamide resin, comprising:
   a central boss portion including a through-hole through which a current collector is press-fittedly inserted;
   a peripheral packing portion interposed between a peripheral portion of an anode terminal plate and an opening of a cathode can; and
   a middle barrier wall portion,
   wherein a mixed material of a recycled material of polyhexamethylene dodecanamide resin which has been once used in injection molding and a virgin material of a polyhexamethylene dodecanamide resin is used as a resin material of a section including at least the boss portion, and a percentage of the recycled material is equal to or more than 10% by weight.

2. A sealing gasket of the alkaline dry cell according to claim 1,
   wherein the recycled material is pulverized particles, of a runner, generated in the injection molding process.

3. A sealing gasket of an alkaline dry cell formed by injection molding of a polyamide resin, comprising:
   a central boss portion including a through-hole through which a current collector is press-fittedly inserted;
   a peripheral packing portion interposed between a peripheral portion of an anode terminal plate and an opening of a cathode can; and
   a middle barrier wall portion,
   wherein a mixed material of recycled and virgin polyhexamethylene dodecanamide resin is used as a resin material of injection molding of at least the boss portion, wherein the recycled material has been once used in injection molding and is present in a percentage equal to or more than 10% by weight of the resin, and moisture in at least the boss portion is set to 1% to 2%.

4. A sealing gasket of an alkaline dry cell formed by injection molding of a polyamide resin, comprising:
   a central boss portion including a through-hole through which a current collector is press-fittedly inserted;
   a peripheral packing portion interposed between a peripheral portion of an anode terminal plate and an opening of a cathode can; and
   a middle barrier wall portion,
   wherein a mixed material of recycled and virgin polyhexamethylene dodecanamide resin is used as a resin material of injection molding of at least the boss portion, wherein the recycled material has been once used in injection molding and is present in a percentage equal to or more than 10% by weight of the resin, and an internal diameter of the through-hole of the central boss portion is equal to or more than 0.91 times and less than 1 times a diameter of the current collector.

* * * * *